US00RE41308E

(19) United States
(12) Reissued Patent
Huang et al.

(10) Patent Number: US RE41,308 E
(45) Date of Reissued Patent: May 4, 2010

(54) OPTIC REFLECTION DEVICE

(76) Inventors: Yin-Chun Huang, 3F, No. 12, Lising 1st Rd., Hsinchu 300 (TW); Chih-Wen Huang, 3F, No. 13, Alley 3, Lane 33, Gongkou St., Hsin-chu 300 (TW)

(21) Appl. No.: 11/150,602

(22) Filed: Jun. 9, 2005

Related U.S. Patent Documents

Reissue of:
(64) Patent No.: 6,575,600
Issued: Jun. 10, 2003
Appl. No.: 09/476,575
Filed: Dec. 22, 2000

(51) Int. Cl.
*F21V 7/04* (2006.01)

(52) U.S. Cl. ..... 362/297; 362/346; 362/343; 355/67; 358/475; 359/855; 359/857

(58) Field of Classification Search ..... 362/297, 362/346, 343, 349, 362; 359/850, 855, 857, 359/831, 871, 883, 848; 358/483, 474, 475, 358/481; 355/67
See application file for complete search history.

(56) References Cited

U.S. PATENT DOCUMENTS 3,737,226 A * 6/1973 Shank ..... 355/67
3,999,201 A * 12/1976 Costa et al. ..... 396/351
4,147,154 A * 4/1979 Lewandowski ..... 126/574
4,168,122 A * 9/1979 Levin ..... 355/113
4,208,676 A * 6/1980 Berwick et al. ..... 348/781
4,396,834 A * 8/1983 Appel et al. ..... 358/494
5,805,323 A * 9/1998 Ichikawa ..... 359/205
6,168,295 B1 * 1/2001 Hein et al. ..... 362/308
6,217,179 B1 * 4/2001 Tang ..... 359/850

* cited by examiner

*Primary Examiner*—Thomas M Sember
(74) *Attorney, Agent, or Firm*—Stolowitz Ford Cowger LLP

(57) ABSTRACT

An Optic Reflection device, for application as Reflectors in the Light Track of optic installations, more specifically, as Reflector for single or multiple reflections in the scanner, apparatus of optics industry. Designed trapezoidal as opposed to rectangular or otherwise configuration pursuant to prior arts. In a preferred embodiment, the application is in the form of a reflector of single reflection to incident light beam; in another preferred embodiment, the application is in the form of reflector permissive of multiple reflections. Design pursuant to the trapezoidal optic reflector pertaining to the invention can substantially reduce space required of Light Track in an optic system, and therefore commensurably volume and weight claimed in the entire optic system, which facilitates compact design of the products and installation of other devices or utilities in the space so saved in the entire optic system.

33 Claims, 8 Drawing Sheets

OPTIC REFLECTION DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a trapezoidal configured optic reflection device, for application as reflectors in the light track of an optic system, more particularly optic installation of single or multiple reflection capabilities in optic scanning operations.

2. Description of the Prior Art

Generally, the imaging principle of common optic scanners involves a Light Track Device which converges working light beams into an image through a multiple reflection process operated with respect to lens assemblies, light signal will then be converted by Charge Coupling Device (CCDs) into electric signal for electronic treatment and memory processing, as Light Track required for optic image production must be definite in length, light path assemblies in optic systems rely on a plurality of reflectors to reflect the working light beam several rounds so as to effectively contract its dimensions. In the course of its journey, the light imaging width will become narrower with an increase in the Track, and the Track Zone will turn smaller commensurably so far as application with the reflector is concerned.

An illustration of a prior art in which the Light Track Assembly 1 as part of a conventional platform optic scanner, is exemplified in FIG. 1, it is seen to consist essentially of a light source 13, three rectanguloid reflectors 14, 15, 16 and a lens 17, plus a Charge Coupling Device (CC) 18. Through a translucent glass 12 light emitted from a light source 13 is directed to a script 11 where the light incident is reflected in the sequential order, to a first reflector 14, thence to a second reflector 15, thence to a third reflector 16, where the light in transit is directed to a lens 17 where the light is converged for reflection to a CCD 18.

Referring to FIG. 2, a three-dimensional presentation of the illustration pursuant to FIG. 1, it will be seen that the chassis 101 for the second reflector 15 and the third reflector 16 is penetrated by at least one gliding shaft 190 and close by said chassis 101 is installed a drive motor 192 by which the Light Track Assembly 1 may be displaced on the drive.

Referring to FIG. 3, an elevation view of the first reflector 14 as shown in FIG. 1, in which the slant lined area 142 is the area convered in use by the first reflector 14.

Referring to FIG. 4, a left side view of what is represented in FIG. 1, illustrating area of use covered by the Light Track pursuant to Reflectors 15, 16, it will be appreciated that the area covered for use 152 by the Light Track of the second reflector 15 differs in size from the area covered 162 for use by the Light Track of the third reflector 16. As a matter of fact while the first reflector 14, the second reflector 15, and the third reflector 16 are dimensionally the same, the area exposed for use by the Light Track in each case is decremented in terms of the sequential order in which the Light Track travels, so understandably with the third reflector 16 the area covered 162 for use in the Light Track is the smallest.

Referring to FIG. 4, it will be appreciated that the Drive Motor 192 is installed beside the chassis 101, with the width of the chassis 101 being denoted L, the width of the Drive Motor 192 denoted L1, it will be apparent all at once that the Drive Motor 192 occupies an additional width L1, that which results in necessary enlargement of both the width and the volume of the scanner to be used, and that means pure, gross waste of precious space.

Referring in continuation to FIG. 5, illustration of the Light Track Zone active while light reflection is in progress as associated with Reflectors 14, 26, of a conventional Paper Feed Type Optic Scanner (Prior Art II), the order of reflection of the working light is as indicated by the arrows. The reflectors as shown comprise a first multiple frequency reflector 24 and a second multiple frequency reflector 26, each capable of reflecting oncoming light beam twice, note that the area covered for use by the working light with the first multiple frequency reflector 24 is not the same with that area covered for use by the same working light with the second multiple frequency reflector 26, the area of use covered by the first multiple frequency reflector 24 is denoted 241, 242, whereas the are of use covered by the second multiple frequency reflector 26 is 261, 262, the magnitude of the area covered in use runs decrementally in the sequential order:241–261–242–262. From the illustration it will be appreciated that apart from areas already covered for use 241, 242, 261, 262 in connection with the Light Track, there are still other areas not covered in use for the same purpose.

Summing up both prior art executions noted in the foregoing one will come to the conclusion that whether it's a reflector to go through single round of reflection, provided plurally in a Light Track Assembly, of prior art I, so to speak; or a reflector to go through repeated reflection, in a same Light Track Assembly, of prior II, albeit technologically differentiable, they are common in that the reflector employed in either case will occupy appreciable space, that which is interpreted in more material required in the making, incurring relatively higher costs, and running contrary to current trends which go for whatever is lighter, slimmer, shorter, and smaller, and it goes without saying, products produced contrary to such vogue in fashion are doubtless wanting in competitive margin.

SUMMARY OF THE INVENTION

To improve such and other shortcomings found with prior art products, enumerated in the foregoing, the invention is proposed as an Optic Reflection Equipment which is executed to be a trapezoidally structured reflector as distinguished from rectanguloidal reflectors of conventional arts, aimed at effectively reducing space required for reflectors while attaining the same functional features as possible through existing, known, prior arts, so that the overall space allowed for and occupied by the entire Light Track is kept to the minimum which in turn means substantial reduction of the whole optic system to a golden minimum. A further object of the invention is to reduce production costs through achieved reduction in the use of material, to be interpreted in a raise in the competitive margin of the products to be released thereby.

The invention provides an optic reflection equipment in the form of a trapezoidal lens serving as a reflector in the Light Track Assembly of an optic system, more specifically in the form of a reflector capable of single or multiple reflection as a unit indispensable in an optic scanner. By definition the function of a reflector is to reflect an incident light beam to a desired direction and to a desired distance. It is to be noted, however, that in the process of going from emission from the light source to a lens where convergence takes place to form an image, the light beam in terms of its imaging width will narrow down commensurate with an increase in the journey of the Light Track, and meantime, the Light Track Zone covered by the reflector in action will become reduced in like measure, and that means, with reflectors installed on a prior art system, there are always areas accounting to nothing but pure waste, and the gist of the invention lies rightly in truncating those areas not being used or not to be used on a reflector so that the reflector, assuming a trapezoidal configuration to such a purpose, will achieve substantial reduction in the volume of the reflector in use, so that the overall volume of the entire optic system in which such reflectors are to be installed, may be reduced to a golden minimum.

In a preferred embodiment of the present invention, the execution of a reflector designed to reflect just once in a working condition for installation in an optic system, in a Light Track thereof, to be specific, is configured trapezoidally by truncating the unused portion, that is, portion not covered in a Light Track in which the reflector is associated.

In still another preferred embodiment of the present invention, in the execution of a reflector fit for multiple reflection in a same Light Track Assembly, in a two-piece reflection mode, for instance, the unused portion of the reflector is duly truncated to represent a trapezoidally configured structure.

With any preferred embodiment of the present invention, executed to be a reflector forming an essential part in the Light Track Assembly of an optic scanner, in a trapezoidal design as an improvement over known prior art such as those recited in the foregoing, invariable is effective reduction of the overall volume of the optic scanner involved in the execution, and that means decided reduction in production cost, as an additional advantage.

To give better understanding of the present invention in terms of its objects, characteristic features and merits, further description follows with reference to the accompanying drawings enclosed herein.

DETAILED DESCRIPTION OF THE PREFERRED EMBODIMENT

The present invention provides an optic reflection device, of a trapezoidal design, and meant for application as a reflector in the Light Track Assembly of an Optic System, more specifically in such a Light Track Assembly which permits or employes single round or multiple reflection technique, of an optic scanner apparatus. A Light Track Assembly in this connection comprises: a light source, a reflection means, a light convergence means and an optico-electric transducer. The Light Source supplies the Light Source needed for operation; the Reflection Means encompasses a plurality of reflectors each serving to reflect light beam incident from the Light Source to a determinate length of journey; the Light Convergence Means receives light coming as reflection from the Reflector and converges same to form an image; the optico-electric transducer receives the light beam with which the light convergence means converges into image and converts same into electric signal; the reflection means is unique in that it's dimensioned according to area covered for use for purpose of reflection when the reflection is at work, and substantially resembling a largely trapezoidal structure as a result of the truncation incurred in the designing process.

Figure 6:
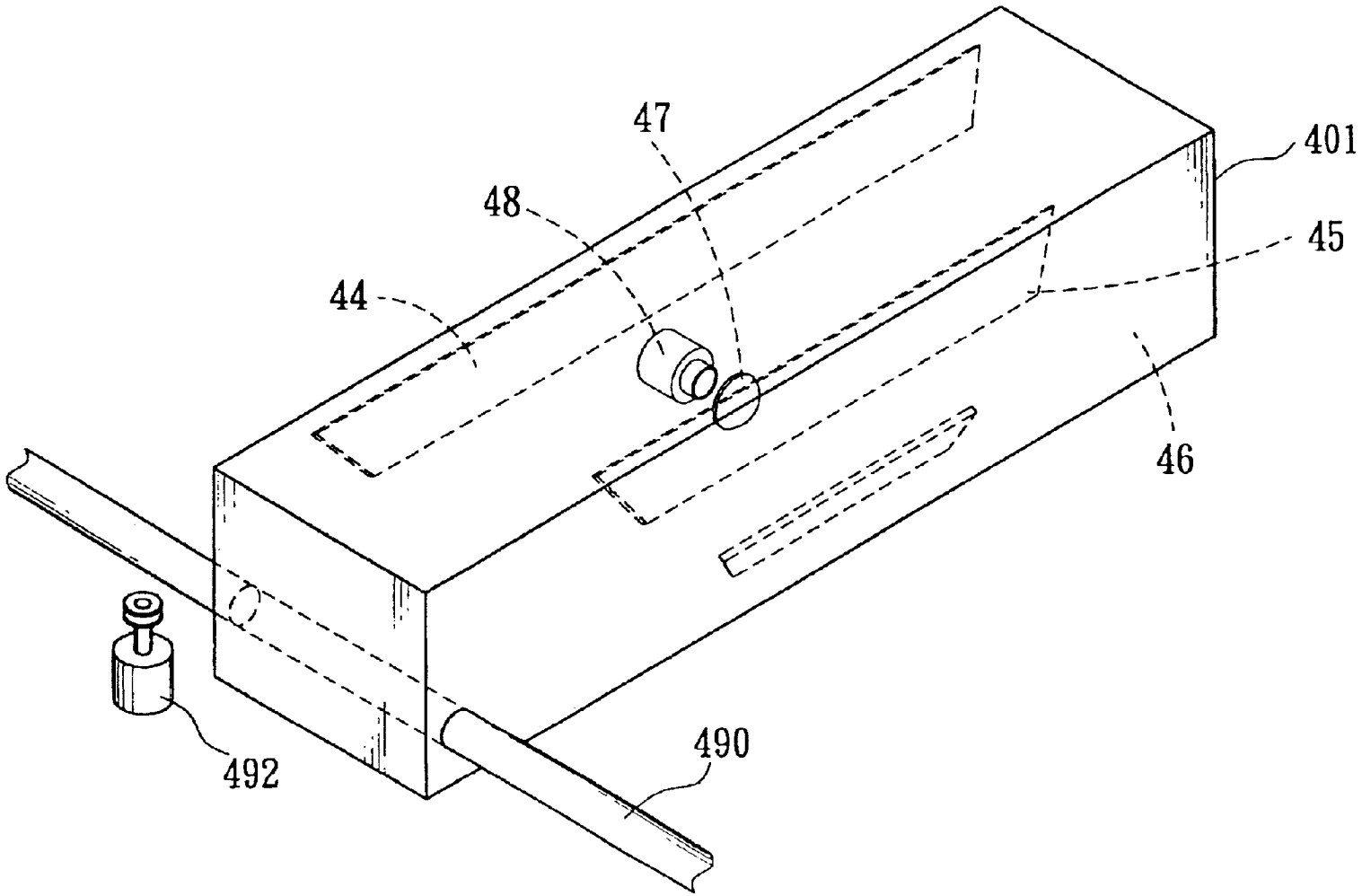
FIG. 6 is a three-dimensional representation of an application of the present invention in the Light Track Assembly of a Platform Type Optic Scanner.

A first preferred embodiment of the invention is the one exemplified in FIG. 6, an illustration of execution, in a three-dimensional perspective, applied in the Light Track Assembly of a platform type optic scanner, featuring elimination by truncation of areas not covered for use in the Light Track when the Reflector is at work, whereby comes realized a first reflector 44, a second reflector 45 and a third reflector 46. The trapezoidal chassis 401 gives mechanical support to said plurality of reflectors 44, 45, 46 and other components of the optic system, such as lens 47 and Charge Coupling Devices 48, while serving also to accommodate attachement of said plurality of reflectors 44, 45, 46 thereto so that reflection to desired direction and to desired distance is made possible with these reflectors 44, 45, 46. That the volume to be occupied by the reflectors is substantially reduced while total deflection capability of the reflectors with respect to incident oncoming light beam is maintained intact accounts rightly for the rationale of the invention, as exemplified in this embodiment, as being in every respect perceivable more advantageous than prior arts known to date.

Figure 7:
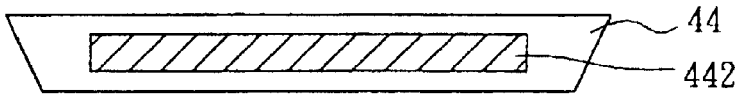
FIG. 7 is an elevation view of the invention as applied in the reflector of a platform type optic scanner.

An illustration of the invention as represented in the first Reflector 44 shown in FIG. 6, in an elevation view of a reflector as applied in a platform type optic scanner, is given in FIG. 7, whereof the slant lined area represents the portion of area 442 covered for use in the Light Track, the Reflector 44 being of a trapezoidal design.

Figure 1:
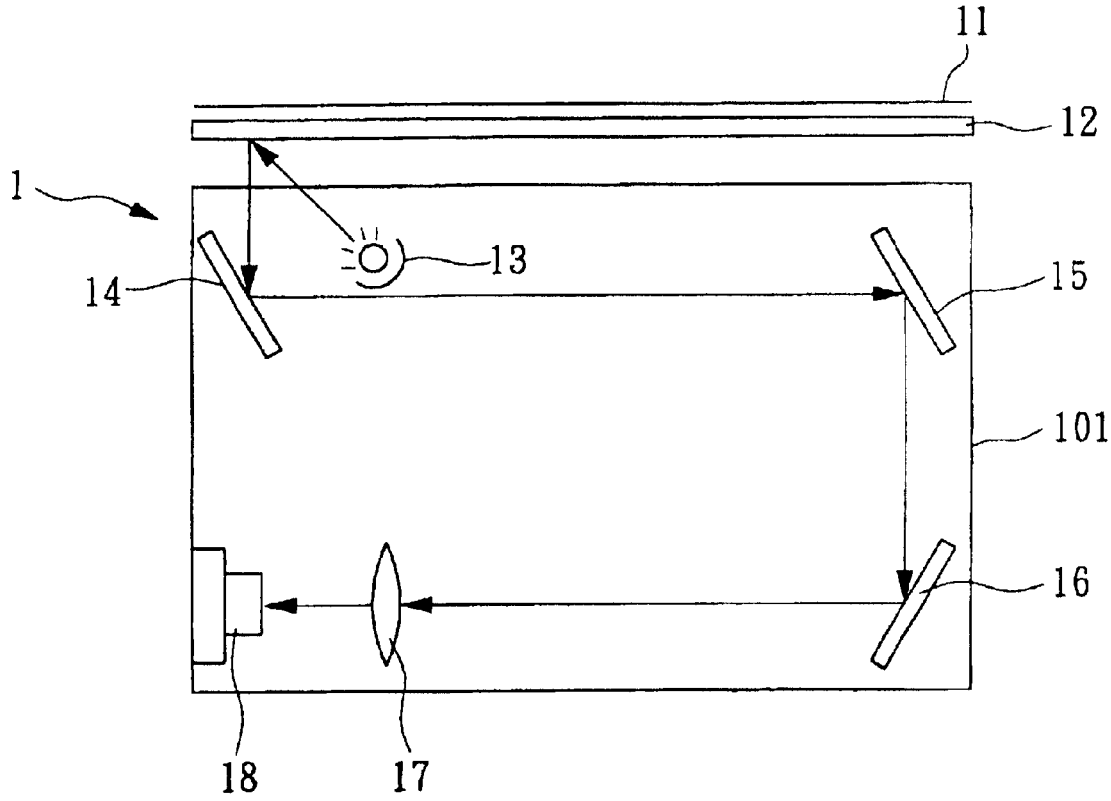
FIG. 1 (PRIOR ART)
FIG. 1 is an illustration of the Light Track Assembly as part of a prior art platform type Optic Scanner.
Figure 2:
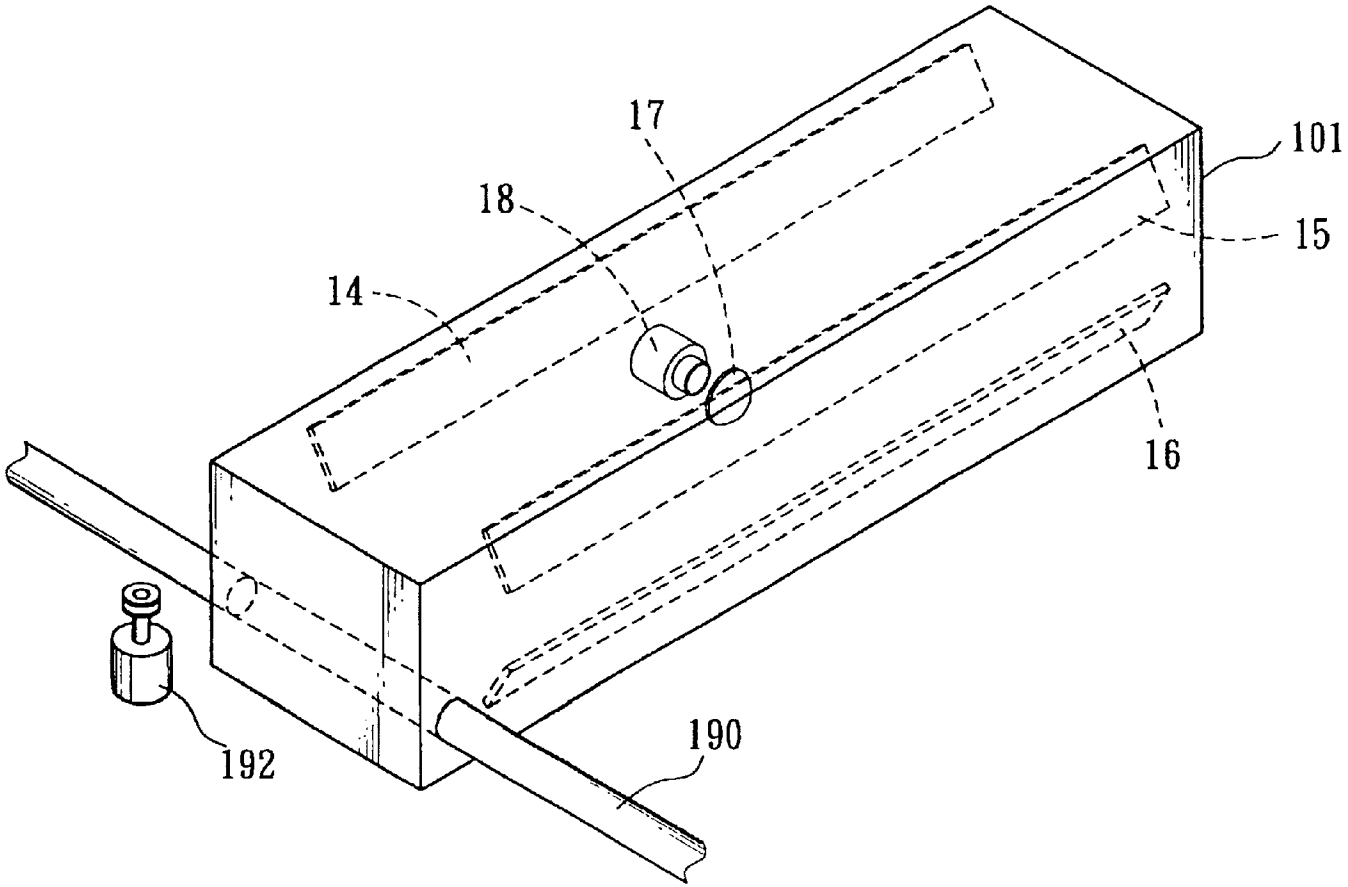
FIG. 2 (PRIOR ART)
FIG. 2 is a three-dimensional view of the Light Track Assembly as part of a prior art platform type optic scanner.
Figure 3:
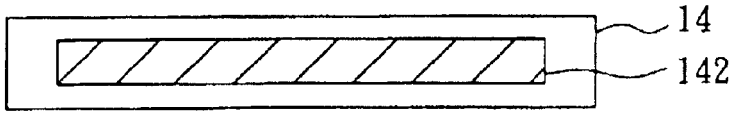
FIG. 3 (PRIOR ART)
FIG. 3 is an elevation view of the reflector incorporated as part of a prior art platform type Optic Scanner.
Figure 4:
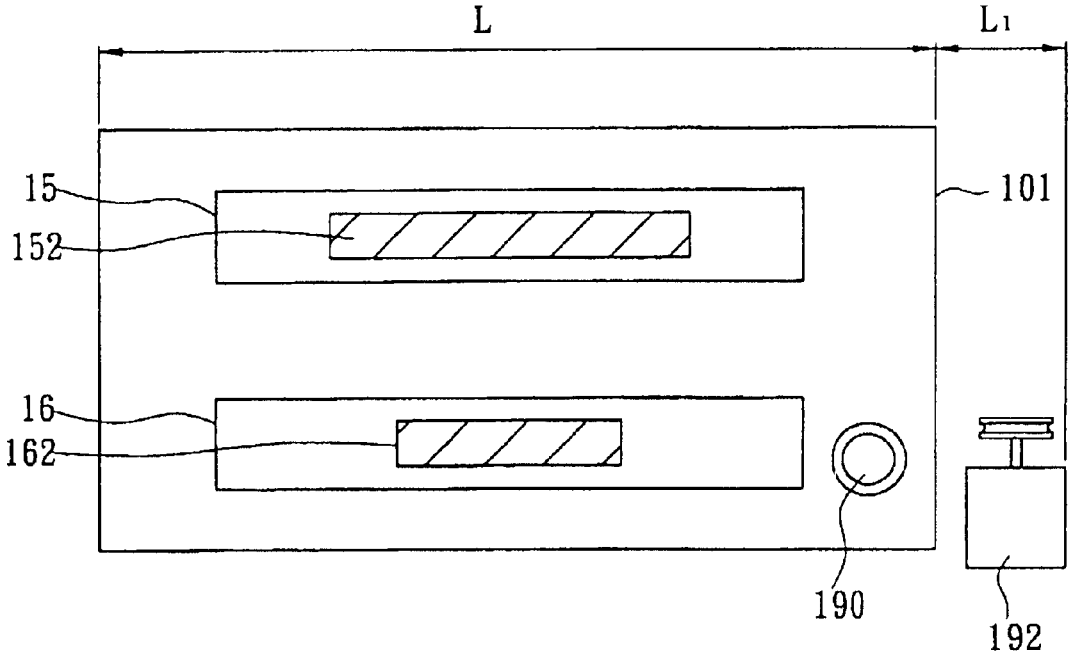
FIG. 4 (PRIOR ART)
FIG. 4 is a left side view of what is represented in FIG. 1, in which is exposed the portion of Light Track covered for use by the Reflectors 15, 16.
Figure 8:
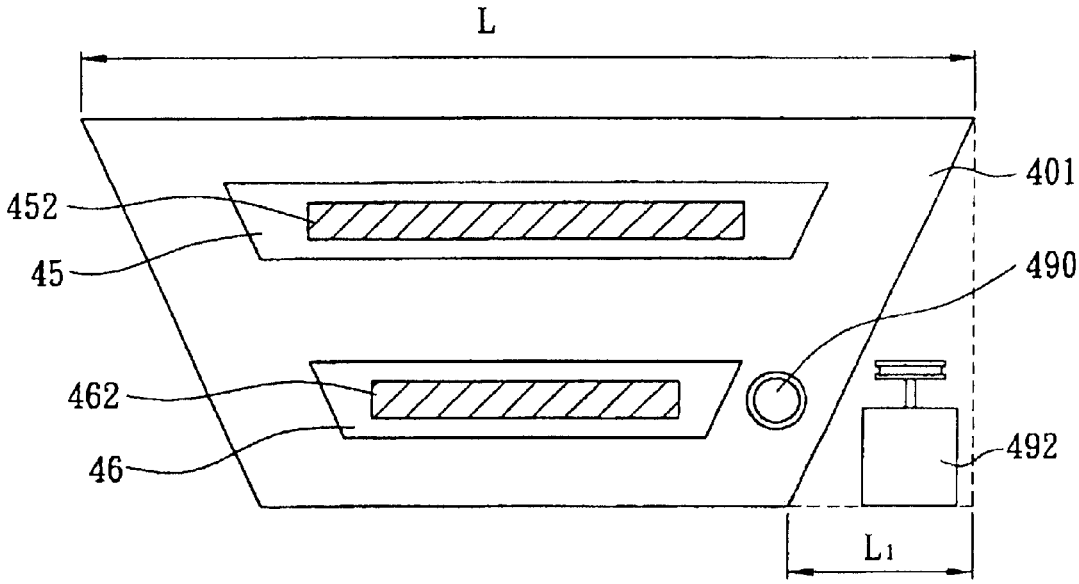
FIG. 8 is a perspective taken from the left side, of the present invention as applied in the Light Track Assembly of a platform type Optic Scanner, in which are exposed portions of Light Track covered by Reflectors 45, 46 when active in operation, and in which it is seen that the chassis is designed to bear a trapezoidal structure.

An illustration of the Light Track Zone used by a first reflector 45, a second reflector 46 of which the chassis bears a trapezoidal structure, as seen perspectively from the left side of a second preferred embodiment of the invention as exemplified in FIG. 6, is given in FIG. 8, in which it is seen that a dimensional difference exists by comparing the Light Track Utility Zone 452 respecting the second reflector 45 whit the Light Track Utility Zone 462 respecting the third reflector 46. It will be appreciated then that portion of the respective zone not in use may be truncated as appropriate so that both the second reflector 45 and the third reflector 46 are configured trapezoidally, further, those cuttings by the truncation made of both the second reflector 45 and the third reflector 46 may serve as a guide of pattern with reference to which the chassis 401 may be designed to bear correspondently trapezoidal structure, so that the space saved accordingly may be turned to accommodate other components or devices, pursuant to this execution what is accommodated in substance is a drive motor 492 of which the width is L1 which is identical to the width L1 of that drive motor 192 represented in FIG. 4 where conventional art is the theme, also, the width of the chassis 401 represented in FIG. 8 is L, still identical to the width L of that chassis 101 represented in FIG. 4, so obviously the execution of a preferred embodiment in this instance will not necessitate an additional space requirement to cover the width L1 of a drive motor 492, and the reduction of the volume of the overall optical system is substantive just as it is substantial, and of course the space saved by the prosecution of the invention need not be limited in its accommodation to a drive motor only, indeed it can accommodate other utilities where appropriate and pertinent to specific applications.

Figure 9:
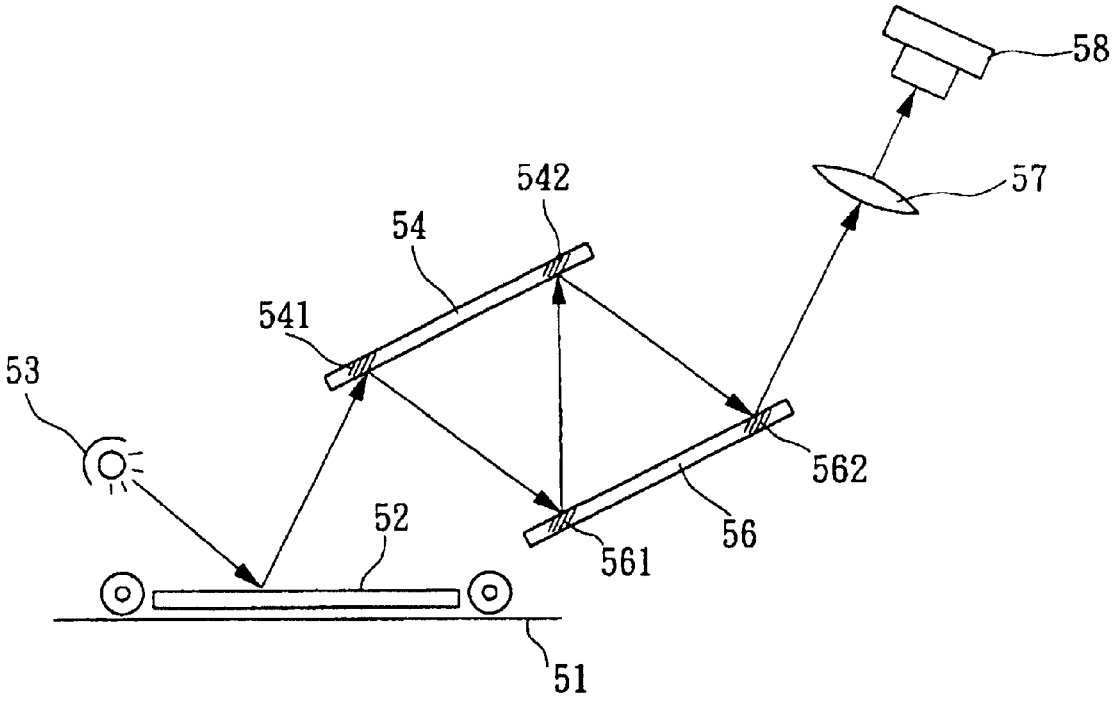
FIG. 9 is an illustration of the present invention as applied in the Light Track Assembly which forms part of a Paper Feed Type Optic Scanner; and, FIG. 10 illustrates the portions of Light Track covered for use by the Reflectors 54, 56 pursuant to the illustration given in FIG. 9.

An illustration of a third preferred embodiment of the inventions as applied to the Light Track Assembly of a Paper Feed Type Optic Scanner is given in FIG. 9, whereof the reflectors 54, 56 are fit for multiple reflections, that is, in a same Light Track the reflector in question may reflect incident light beams repeatedly as dependent upon the area covered for use in the Track, by the same token different, dissimilar utility areas may be allotted on a same reflector, in this embodiment the design is for two rounds of reflection and the utility areas allotted are two. As shown, light emitted from a light source 53 travels to a script 51 by way of a translucent glass 52, the light oncoming is then reflected to a first reflection area 541 on a first multiple reflection lens 54, thence passing reflected to a first reflection zone 561 for the second multiple reflection lens 56, again to the second reflection zone 562 for the second multiple reflection lens 56, eventually converged at a lens 57, and directed to a Charge Coupling Device 58.

Figure 5:
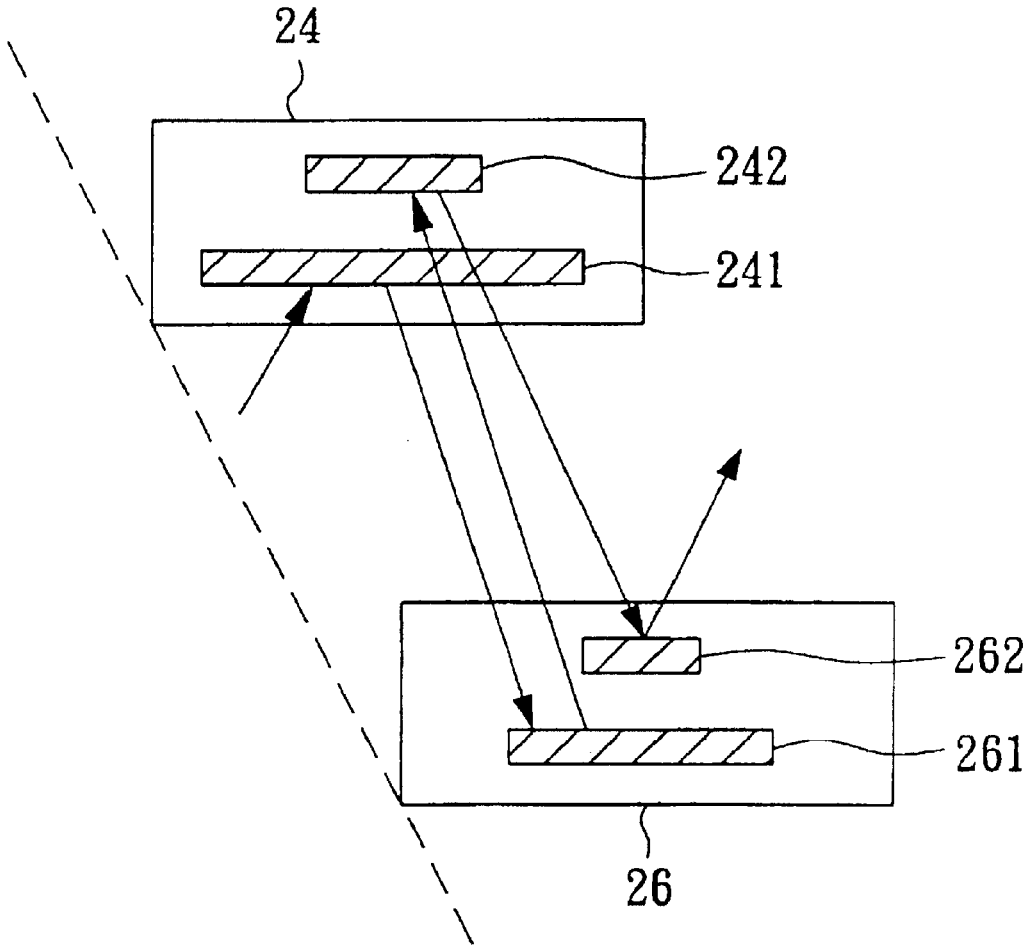
FIG. 5 (PRIOR ART)
FIG. 5 is an illustration of the Light Track Zone covered by a reflector active in a course of reflection, as part of a prior art Paper Feed Type Optic Scanner.
Figure 10:
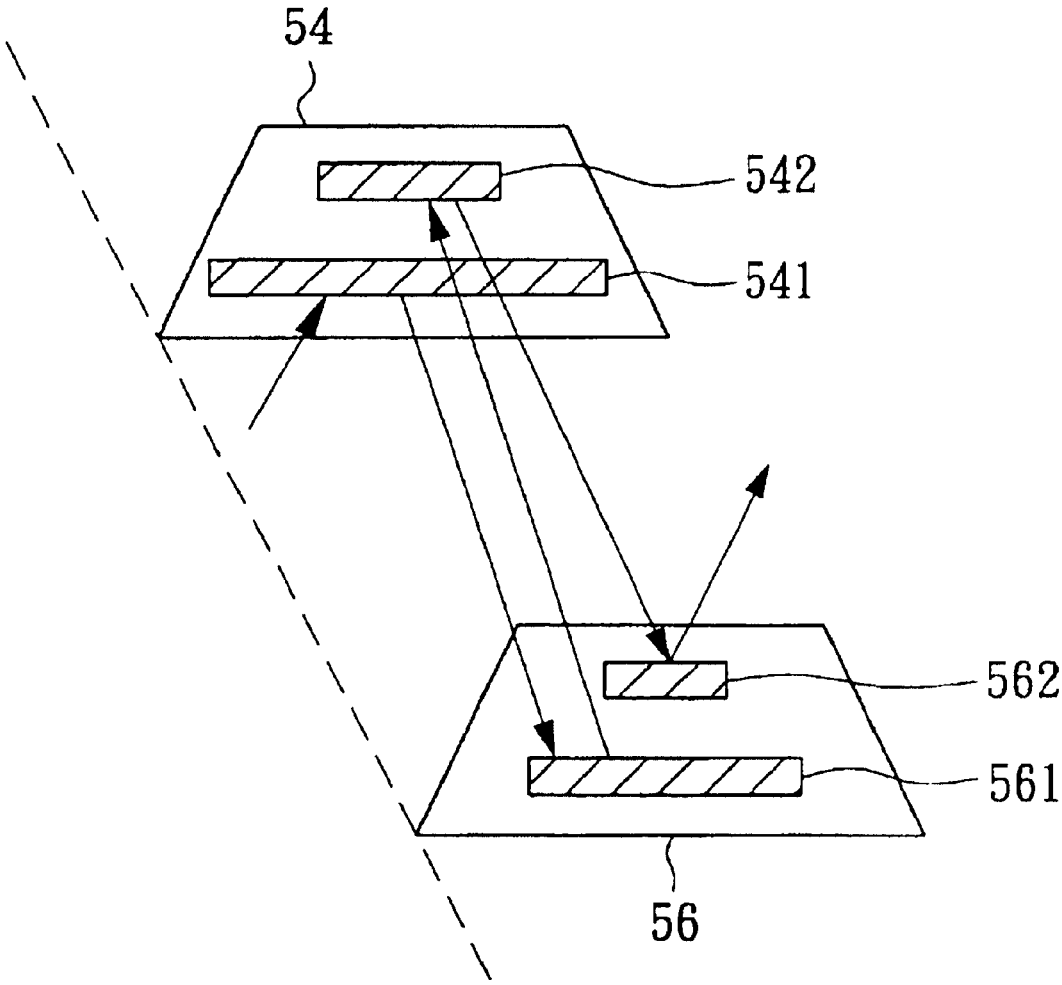

Referring to FIG. 10, an illustration of the Light Track Zone which comes to service once reflection is taking place owing to the reflectors 54,56 represented in FIG. 9. From the drawing it will be seen that trapezoidal is a common pattern for both the first multiple reflection lens 54 and the second multiple reflection lens 56. The sequence of journey of the Light Track is thus: the first reflection area 541 for the first multiple reflection lens 54, the first reflection area 561 for the second multiple reflection lens 56, the second reflection area 542 for the first multiple reflection lens 54, and the second reflection area 562 for the second multiple reflection lens 56, it is to be noted altogether that the Light Track Zone will decrement as the light beam travel past more of the interim zones, that fact underlies the rational for truncation, where appropriate, of unused portions of the zone, and the result is a preferred embodiment exemplified by the drawing. By comparing the third preferred embodiment of the invention disclosed herein with the prior art as illustrated in FIG. 5, it will be appreciated that the embodiment in this instance features substantial reduction of the volume of the lens, which in turn means commensurate contraction of the space required of the Light Track Assembly, and that further reduces space requirement of the entire optic system.

By the comparison made of the various embodiments of the invention exemplified herein with prior art executions, what emerges evident all at once is effective improvement over shortcomings inherent with prior art executions, and that compounded with additional merits, seen not only in space savings gained on reflectors so that overall dimension of the entire optic system is rendered less cumbersome and more compact, but also that saving of material is achieved at the same time which means a cutdown in production costs making the product more competitive on the market.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiment thereof may occur to those skilled in the art. Accordingly, the appended claims are intended to cover all embodiment which do not depart from the spirit and scope of the invention.

What is claimed is:

1. An optic reflection device for use in an optic system, comprising:

a light source for providing light;

a plurality of reflection mirrors, with at least one reflection mirror having a trapezoidal cross-section, wherein each reflection mirror [reflecting] *reflects* the light from the light source towards a predetermined direction;

a lens set that focuses the light from the reflection mirrors; an image sensor that receives the focused light from the lens set and converts the focused light into digital signals; and a chassis that houses and positions the light source, the reflection mirrors, the lens set and the image sensor, with the chassis having a trapezoidal cross-section.

2. The device of claim 1, wherein each reflection mirror has a trapezoidal cross-section with a constant thickness throughout its cross-section.

3. The device of claim 1, wherein each reflection mirror has a trapezoidal cross-section, and has exactly one reflecting surface.

4. The device of claim [1] *3*, wherein [the] *a* first reflection mirror is positioned so that [the] *its* exactly one reflecting surface reflects the light from the light source at least two times.

5. An optic reflection device for use in an optic system, comprising:

a light source for providing light towards an object to generate a reflected light of the object;

a plurality of elongated reflection mirrors each reflecting the reflected light to a predetermined location*;* a lens set that focuses the reflected light from only one of the reflection mirrors; and an image sensor that receives the reflected light from the lens set and converts the reflected light into digital signals;

wherein the light source, reflection mirrors and lens set are positioned to define a single light path; and wherein at least one of the plurality of elongated reflection mirrors has a trapezoidal shape that has four edges, with a first set of two of the edges being elongated and parallel to each other, and a second set of the other two of the edges being disposed at an angle with respect to each other, and with the four edges defining exactly one reflecting surface that has said trapezoidal shape.

6. The device of claim 5, wherein the trapezoidal-shaped reflection mirror reflects the reflected light at least two times in the light path, with the first set of edges reflecting the reflected light a first time, and with the second set of edges reflecting the reflected light a second time.

7. The device of claim 5, wherein the image sensor is a charge-coupled device.

8. The device of claim 5, wherein the trapezoidal-shaped reflection mirror has a constant thickness.

9. The device of claim 5, further comprising a chassis for supporting the light source, the reflection mirrors, the lens set and the image sensor, the chassis having a trapezoidal cross-section having a constant width and a constant height, and having an upper surface and a lower surface that has a smaller length than the upper surface.

*10. An apparatus, comprising:*

*means for providing light;*

*means for reflecting the light within the apparatus;*

*means for directing the reflected light;*

*means for sensing the directed light;*

*means for housing and positioning the light providing means, the reflecting means, the light directing means, and the sensing means, the housing means having a cross section with two parallel edges and two non-parallel edges, the housing means having a top portion that is wider than a bottom portion of the housing means;*

*wherein the wider top portion is positioned above the bottom portion to form an overhang; and*

*means for driving movement of a light track assembly of the apparatus;*

*wherein said driving means is positioned at least partially beneath the overhang.*

*11. The apparatus of claim 10, wherein a width of the overhang corresponds to a width of the driving means.*

*12. The apparatus of claim 10, wherein the reflecting means has a trapezoidal shape that has four edges, with at least two of the reflecting means edges disposed at an angle with respect to each other.*

*13. The apparatus of claim 10, wherein the light reflecting means includes a plurality of reflection lenses.*

*14. The apparatus of claim 13, wherein at least one of the plurality of reflection lenses includes a trapezoidal-cross section and exactly one reflecting surface.*

*15. An apparatus, comprising:*

*means for providing light;*

*means for reflecting the light within the apparatus;*

*means for directing the reflected light;*

*means for sensing the directed light; and*

*means for housing and positioning the light providing means, the reflecting means, the light directing means, and the sensing means, the housing means having a trapezoidal cross section, the housing means having a top portion that is wider than a bottom portion of the housing means;*

*wherein the wider top portion is positioned above the bottom portion;*

*wherein the light providing means is positioned to reflect light from a front surface of a document.*

*16. The apparatus of claim 15, wherein the reflecting means includes a single reflector having a first reflection region and a second different reflection region.*

*17. The apparatus of claim 16, wherein the regions are located on a same side of the single reflector.*

*18. The apparatus of claim 15, wherein the reflecting means has a trapezoidal cross-section.*

*19. A method comprising:*

*positioning a reflector component to reflect light generated by a light source along a light path extending through a light directing component and between a document platform and an image sensor;*

*providing a chassis to house and position the light source, the reflector component, the light directing component, and the image sensor, the chassis having a trapezoidal shape, the chassis having a top portion that is wider than a bottom portion of the chassis; and*

*positioning a scanner component adjacent to the bottom portion of the chassis, the scanner component positioned at least partially below an overhang associated with the wider top portion.*

*20. The method of claim 19, wherein the scanner component comprises a motor to drive movement of a component within the chassis.*

*21. The method of claim 19, further comprising positioning the light source inside the chassis, the light source positioned to generate a reflection from a document.*

*22. The method of claim 19, wherein the reflector component has a trapezoidal cross-section.*

*23. The method of claim 22, wherein the reflector component is positioned to reflect the light twice from a same side of the reflector component before the light is directed to the image sensor.*

*24. An optic reflection device, comprising:*

*a light source configured to provide light;*

*a plurality of reflector components operable to reflect the light towards a predetermined direction;*

*a light focusing component configured to focus the light from the reflector components;*

*a chassis configured to house and position the light source, the reflector components, the light focusing component, and a light sensor, the chassis having a trapezoidal shape, the chassis having a top region having a different width than a bottom region of the chassis; and*

*a scanner component adjacent to the narrower region of the chassis, the scanner component positioned in a space associated with the difference in region widths.*

*25. The device of claim 24, wherein each reflector component has a trapezoidal shape with a constant thickness throughout its cross-section.*

*26. The device of claim 24, wherein each reflector component has a trapezoidal shape and one reflecting surface.*

*27. The device of claim 26, wherein at least one of the reflector components is positioned so that its reflecting surface reflects the light at least two times.*

*28. An optic device, comprising:*

*a light source;*

*a reflection component configured to reflect light generated by the light source to a predetermined location;*

*a light directing component configured to direct light reflected from the reflection component; and*

*a light sensor configured to receive the directed light; and*

*a chassis having a trapezoidal cross-section, the chassis structured to house the light source, the reflection component, the light directing component and the light sensor;*

*wherein the reflection component has a trapezoidal cross-section and a trapezoidal shaped reflecting surface.*

*29. The optic device of claim 28, wherein the reflection component includes four edges that define exactly one trapezoidal shaped reflecting surface.*

*30. The optic device of claim 29, wherein the four edges define only one trapezoidal shaped reflecting surface.*

*31. The optic device of claim 30, wherein the reflection component has only one reflecting surface that is trapezoidal shaped.*

*32. The optic device of claim 28, wherein the trapezoidal cross-section of the chassis corresponds to interior surfaces of the chassis.*

*33. The optic device of claim 32, wherein an outer surface of the chassis has a rectangular cross-section.*

* * * * *